United States Patent Office 3,282,900
Patented Nov. 1, 1966

3,282,900
TWO STAGE POLYMERIZATION PROCESS INVOLVING NON-GASEOUS VINYL MONOMERS WITH ALUMINUM ALKYLS AND α,α′-AZOBISISOBUTYRONITRILE
Rajendra N. Chadha and Thomas E. Ferington, Silver Spring, Md., assignors to W. R. Grace & Co., New York, N.Y., a corporation of Connecticut
No Drawing. Filed May 21, 1963, Ser. No. 282,150
30 Claims. (Cl. 260—78.5)

The present invention relates to a novel and useful composition of matter, an improved polymerization process utilizing the composition and the product resulting from the polymerization process. More particularly it is directed to a vinyl monomer composition, an improved polymerization process employing said vinyl monomer and the product resulting from the polymerization process.

It is an object of the present invention to provide a vinyl monomer composition which will polymerize on exposure to an oxygen containing gas such as air. A further object is to provide a vinyl monomer composition which will give fast reaction rates and high rates of conversion when reacted in conjunction with an oxygen containing gas such as air. Another object is to provide an improved polymerization process. A still further object is to provide the product resulting from the improved polymerization process. Other objects will become apparent from reading hereinafter.

These objects are accomplished by the present invention which provides a composition of matter comprising (A) a non-gaseous vinyl monomer, (B) an aluminum alkyl compound, and (C) α,α′-azobisisobutyronitrile. In a preferred embodiment of the present invention, the vinyl monomer is an acrylic acid ester, methacrylic acid ester, vinyl ether, vinyl nitrile, or vinyl alkanoate such as vinyl acetate and vinyl propionate.

The present invention also provides a process for the polymerization of a non-gaseous vinyl monomer reactant by mixing said monomer with an aluminum alkyl compound and α,α′-azobisisobutyronitrile and thereafter, preferably in an oxygen free atmosphere, exposing said film or coating to ultraviolet light or heat. In a preferred embodiment of the present invention, acrylic acid is added to the system to further improve polymer yield.

In another preferred embodiment the aluminum alkyl compound is employed in complexed form as will be discussed hereinafter.

The invention further provides the polymerization product in the form of a film or coating from the aforementioned polymerization process.

In a copending application having Serial No. 245,974, filed December 20, 1962 now abandoned, and assigned to the same assignee, there is disclosed a process for polymerizing vinyl monomers by mixing said monomer with an aluminum alkyl compound and exposing said mixture as a film or coating to an oxygen-containing atmosphere such as air. Although the polymer product especially in the case where the vinyl monomer is an ester of acrylic acid, is harder and has superior dimensional stability at elevated temperatures than the acrylates polymerized by prior art free radical systems, the polymer yields are low in this single stage polymerization. It has also been found that if the esters of acrylic acid are polymerized solely by exposing said monomers in the presence of α,α′-azobisisobutyronitrile to ultraviolet light, preferably in a deoxygenated atmosphere, the yields are greatly increased but the polymer obtained is tacky and soft. Thus, to obtain the synergistic effect of obtaining a relatively hard polyacrylate product and high yield of polymer product, the two stage polymerization of the present invention must be employed.

In summary, this invention is concerned with exposing a film or coating of a mixture of a non-gaseous vinyl monomer, catalytic amounts of an aluminum alkyl compound and α,α′-azobisisobutyronitrile (AIBN) to the action of a free oxygen-containing gas, e.g. air, ozone, oxygen, thus initiating the polymerization of the vinyl monomer in situ as a film or coating and thereafter in an inert oxygen-free atmosphere exposing said film or coating to UV light or heating said film or coating to a temperature in the range 70–100° C.

The polymerization reaction is a two stage process, namely,

*First stage:* Oxygen sensitized polymerization of the vinyl monomer by the aluminum alkyl compound, followed by;

*Second stage:* a free radical polymerization, preferably in an oxygen-free atmosphere, on decomposition of the α,α′-azobisisobutyronitrile by heat or ultraviolet light. Conversions of monomers to polymer up to 90% and higher have been attained with this novel two stage process as will be shown in examples hereinafter.

The efficiency of the process is greatly effected by the atmosphere in which the polymerization is performed. It is necessary that the first stage be carried out in an oxygen-containing atmosphere, e.g. air, as oxygen initiates the first stage reaction. After the first stage reaction is complete, i.e. in a period of 1–60 minutes, preferably 1–30 minutes, the second stage reaction is initiated. The second stage reaction is preferably but not necessarily performed in an inert oxygen-free atmosphere, e.g. nitrogen or a noble gas when UV light is employed to decompose the α,α′-azobisisobutyronitrile. In instances where heat is employed to decompose the α,α′-azobisisobutyronitrile into free radicals, at temperatures ranging from 70° C. up to the boiling point of the vinyl monomer, the reaction may be performed in an oxygen-containing atmosphere, but yields are higher if an inert oxygen-free atmosphere is employed.

The term "non-gaseous" used in conjunction with the vinyl monomers herein means that the monomer is not a gas under standard conditions of temperature and pressure. Thus the vinyl monomers are either liquid or solid. The term "vinyl monomers" herein means compounds of the formula

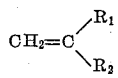

wherein $R_1$ is hydrogen or an organic radical and $R_2$ is an organic radical. The vinyl monomers are well-known in the art and include such materials as acrylic acid esters, methacrylic acid esters, vinyl nitriles, vinyl ethers and the like. Among the suitable acrylic acid esters which may be employed in the present invention are: methyl acrylate; ethyl acrylate; n-propyl acrylate; isopropyl acrylate; n-butyl acrylate; isobutyl acrylate; sec-butyl acrylate; tert-butyl acrylate; n-pentyl acrylate; n-hexyl acrylate; 2-ethylbutyl acrylate; 2-ethylhexyl acrylate; n-heptyl acrylate; n-octyl acrylate; 3,5,5-trimethylhexyl acrylate; octadecyl acrylate; cyclopentyl acrylate; cyclohexyl acrylate; abitol acrylate (mixed isomers); n-decyl acrylate; tridecyl acrylate; 3,3,5-trimethylcyclohexyl acrylate; 2-n-butoxyethyl acrylate; 2-ethoxyethyl acrylate; 3-ethoxypropyl acrylate; 3-methoxybutyl acrylate; 2-methoxyethyl acrylate; benzyl acrylate; 2-phenoxyethyl acrylate; phenyl acrylate; 2-phenylethyl acrylate; 2-bromoethyl acrylate; 2-chloroethoxyethyl acrylate; 2-chloroethyl acrylate; 2,2,2-trifluoroethyl acrylate; N,N-diethylaminoethyl acrylate; 1,1-dihydroheptafluorobutyl acrylate, N,N-dimethylaminoethyl acrylate; 2-N-morpholinoethyl acrylate and tetrahydrofurfuryl acrylate.

Other suitable vinyl monomers include: abitol methacrylate; acrylamide; acrylonitrile; acrylyl chloride; allyl acetic acid; allylidene diacetate; N-allyl acrylamide; aniline; allyl crotonate; allylmethacrylamide; allyl methacrylate; n-amyl methacrylate; iso-amyl methacrylate; benzyl methacrylate; 2-bromoethyl methacrylate; 2,2-butoxyethyl methacrylate; N-tert-butylacrylamide; sec-butyl methacrylate; iso-butyl methacrylate; tert-butyl methacrylate; 2-chloroethyl methacrylate; N-(parachlorophenyl)-acrylamide; N-(para-chlorophenyl)-methacrylamide; 2-chlorostyrene; 3-chlorostyrene; 4-chlorostyrene; cinnamyl methacrylate; beta-cyanoethyl methacrylate; cyclohexyl methacrylate; cyclopentyl methacrylate; n-decyl methacrylate; N,N-diallylacrylamide; N,N-diallylmethacrylamide; 2,5-dichlorostyrene; N,N-diethylacrylamide; N,N-diethylaminoethyl methacrylate; 1,1-dihydroheptafluorobutyl methacrylate; N,N-dimethylallylamine; N,N-dimethylaminoethyl methacrylate; 2-ethoxyethyl methacrylate; ethylene dimethacrylate; 2-ethylhexoxyethyl methacrylate; 2-ethylhexyl methacrylate; ethyl methacrylate; furfuryl methacrylate; n-heptyl methacrylate; n-hexyl methacrylate; n-lauryl methacrylate; lauryl methacrylate; methacrylamide; 3-methoxybutyl methacrylate; 2-methoxyethyl methacrylate; methyl methacrylate; alpha-methylstyrene; N-(beta-naphthyl) methacrylamide; octa-decyl methacrylate; isopropyl methacrylate; styrene; tetraethyleneglycol dimethacrylate; 3,3,5-trimethylcyclohexyl methacrylate; 3,5,5-trimethylhexyl methacrylate; vinyl acetate; vinyl n-butyl ether; vinyl isobutyl ether; vinyl butyrate; vinyl 2-chloroethyl ether; vinyl isobutyl ether; vinyl butyrate; vinyl 2-chloroethyl ether; vinyl n-decanoate; vinyl ethylether; vinyl 2-ethylhexoate; vinyl 2-ethylhexyl ether; vinyl iodide; vinyl laurate; vinyl methacrylate; vinyl 2-methoxyethyl ether; vinyl n-octanoate; vinyl oleate; vinyl phenylacetate; vinyl propionate and vinyl stearate. The monomers may be used individually or in various combinations to form copolymers. Many others are known in the art and may likewise be used.

By the term "aluminum alkyl compounds" as used throughout this invention is meant a compound having the general formula:

in which R is alkyl (e.g. methyl, ethyl, propyl, isopropyl, butyl, isobutyl, etc., including octyl, dodecyl, and so on; R' is H, Cl, or alkyl; and R" is either H or alkyl; provided that when R' is Cl, R" is alkyl. Among the various aluminum alkyl compounds which may be employed are triethyl aluminum; triethyl aluminum/diethyl aluminum hydride mixtures; triisobutyl aluminum; trimethyl aluminum; diethyl aluminum chloride; trioctyl aluminum; tri-n-butyl aluminum; triisopropyl aluminum; tridodecyl aluminum; diethyl methyl aluminum; diethyl isobutyl aluminum; diethyl isobutyl aluminum; diisobutyl ethyl aluminum; diethyl aluminum bromide; dioctyl aluminum chloride; didodecyl aluminum chloride; diethyl aluminum hydride; diisobutyl aluminum hydride; dioctyl aluminum hydride and the like. The alkyl aluminum compounds may be employed individually or in various mixtures.

The amount of aluminum alkyl is not critical. As little as 0.01 weight percent (on the total amount of solution) is operable, and as much as 25% can be used. Amounts of the lower aluminum alkyls in excess of 25% are hazardous to use because of the inflammability of the aluminum alkyl at such concentrations. Even concentrations of the lower alkyls in the range of 10–25%, though operable, are too reactive to handle with ease. Expressed in mole percents, aluminum alkyl concentrations of 0.005–25 mole percent (of the monomer) are operable, the range of 0.01–10 mole percent being preferred. Even smaller amounts than 0.005 mole percent are operable, but are not recommended because yields are drastically reduced.

In practicing this invention the aluminum alkyl compound in the catalyst is preferably used in complex form to polymerize the vinyl monomers of the instant invention.

The aluminum alkyl compound can be complexed with saturated or unsaturated esters of monocarboxylic acid, said acid having 1–20 carbon atoms. Examples of these complexing esters include, but are not limited to, ethyl acetate, ethyl propionate, vinyl propionate, vinyl acetate, ethyl acrylate, n-butyl acrylate, t-butyl acrylate, methyl methacrylate and the like. The complex can be made by preforming with efficient cooling, a mixture of the aluminum alkyl compound with the aforesaid saturated or unsaturated monocarboxylic esters in a mole ratio of 1:1 and thereafter adding said complex to the monomer mixture. The use of the aluminum alkyl in complex form as a catalyst component decreases the exotherm of the reaction which occurs when the aluminum alkyl compound is mixed with the major portion of the monomer reactant and thus allows for better temperature control. If adequate temperature control, i.e. below about 60° C., is not maintained the azobisisobutyronitrile prematurely decomposes and initiates polymerization which results in a foamed product prior to exposing the reactants to oxygen. Hence although the aluminum alkyl compound is operable without complexing when temperature control is maintained, it is preferable to employ said compound in a complex form in the instant invention.

The amount of $\alpha,\alpha'$-azobisisobutyronitrile used as a catalyst in the instant invention is operable in the range 0.05 to 1.0% by weight based on the weight of the monomer, preferably 0.2 to 0.5%. Care should be exercised, especially when using amounts near the upper limit of the aforesaid operable range, that the $\alpha,\alpha'$-azobisisobutyronitrile is not decomposed too rapidly, lest the nitrogen gas, resulting from the decomposition, channel through the unpolymerized portion of the film and cause bubbles therein. This problem is greatly alleviated if the aluminum alkyl compound is complexed prior to addition to the monomer as aforestated.

In practicing this invention, it has also been found that acrylic acid may, if desired, be added in amounts of 0.5 to 5% by weight based on the weight of the vinyl monomer, preferably 1.0 to 2.0% by weight, to increase the yield of polymer as will be shown by examples hereinafter.

On admixture of the reactants, namely the vinyl monomer, aluminum alkyl compound and $\alpha,\alpha'$-azobisisobutyronitrile, it is important that the admixture is not exposed to free-oxygen prior to its desired use as film or coating. The storage life of the admixed reactants is shorter than desired, especially if acrylic acid is present. By "storage life" is meant the time period during which the reactants can remain as a mixture without polymerization occurring. It has been found that the addition of maleic anhydride, or substituted maleic anhydride, e.g., dichloromaleic anhydride, added in amounts of 0.5 to 5% by weight based on the weight of the vinyl monomer preferably 1.0 to 2.0% by weight, increases the storage life considerably.

In the examples herein, the hardness of the polymerized vinyl film was determined by a pencil hardness test as follows. A series of pencils of varying hardness were sharpened to blunt points with sandpaper. The pencil point was then held against the film at a 45° angle and pressed forward across the film with as much pressure as the lead pencil point would stand. The film hardness is the softest pencil which will mar the film. The pencil hardness test as used herein is more fully described in an article by H. A. Gardner and G. S. Sward, in Paint Testing Manual, 12th ed., page 131, Gardner Laboratories, Bethesda, Maryland, 1962.

In the examples herein, unless otherwise noted, the general polymerization procedures was as follows. The aluminum alkyl compound was complexed in a deoxygenated rubber stoppered test tube with a saturated or unsaturated monocarboxylic ester, usually an acrylic acid ester, e.g., n-butyl acrylate, in a 1:1 mole ratio at subzero temperatures supplied by a Dry Ice-acetone bath.

Into a separate rubber stoppered test tube, the α,α'-azobisisobutyronitrile (AIBN) is charged along with such additives as desired. Such additives may include maleic anhydride to increase storage life, fillers, such as clay or carbon black, thickeners such as prepolymers, and pigments such as metallic oxides. The tube containing AIBN and any additives desired is deoxygenated and the vinyl monomer is then added to the tube under nitrogen along with, if desired, acrylic acid to increase polymer yield. The aluminum alkyl compound per se or in complexed form is then added to the tube under nitrogen at sub-zero temperature via a deoxygenated hypodermic needle and syringe inserted through the rubber stopper in the test tube. A sample of the monomer-AIBN-catalyst complex solution is withdrawn from the test tube by means of a deoxygenated hypodermic syringe and sprayed into a preweighed dish in a sealed transparent box, exposed to air at room temperature, i.e., 25° C. to form a thin film. After about 1–60 minutes during which time the first stage polymerization occurs, the first stage polymerization is discontinued and a nitrogen stream is passed to deoxygenate the box. The nitrogen flow is discontinued leaving the partially polymerized film in an inert nitrogen atmosphere. An UV source is then directed onto the film from outside the box. The UV irradiation decomposes the azoisobutyronitrile thus initiating the second stage of the polymerization. The irradiation is continued for periods ranging from 5 minutes to 1½ hours, preferably about 30 minutes at UV wave lengths in the range 2000 to 4000 A. After the irradiation is discontinued the glass dish containing the polymerized vinyl film is dried at 25° C. for 1–2 days in vacuo. The dried polymer film samples are then weighed to determine percent conversion and tested for hardness by the pencil test mentioned supra.

In the examples where heat is employed to decompose the α,α'-azobisisobutyronitrile instead of UV light, the first stage procedure is as stated herebefore. After termination of the first stage, the dish containing the partially polymerized film is placed in an oven at temperatures ranging from about 70° C. whereat the α,α'-azobisisobutyronitrile decomposes up to the boiling point of the monomer being polymerized, for a period ranging from 15 minutes to 2 hours, preferably about 30 minutes. The gas flow through the oven can be regulated so that a nitrogen atmosphere can be supplied when and if desired.

The following examples illustrate without limiting the invention.

*Example 1.—Preparation of catalyst complex*

6.3 ml. of pure diisobutyl aluminum hydride were charged to a deoxygenated serum-stoppered test tube placed in a Dry Ice-heptane cooling bath at minus 65–75° C. A nitrogen stream was continued through the tube while 5.0 ml. of deoxygenated n-butyl acrylate was added thereto. The tube was removed from the bath still under a nitrogen blanket, and allowed to warm to room temperature with gentle shaking. The thus formed diisobutyl aluminum hydride:butyl acrylate complex had a mole ratio of 1:1.15 respectively. The complex was stored under $N_2$ until used in subsequent examples herein. This complex will be referred to herein as catalyst complex A.

*Example 2.—Preparation of monomer solution*

0.89 g. of maleic anhydride were charged to a 50 ml. dropping bottle. The bottle was capped with a serum stopper and deoxygenated by passing dry nitrogen through hypodermic needles in the serum stopper for 30 minutes. 50 ml. of deoxygenated n-butyl acrylate were added to the bottle by means of a 50 ml. syringe followed by the addition of 0.625 ml. acrylic acid. Nitrogen was continually bubbled through the bottle. This monomer solution will be referred to herein as monomer solution B.

*Example 3*

5 ml. of monomer solution B from Example 2 were withdrawn and charged to a deoxygenated serum-stoppered test tube containing 0.0144 g. of α,α'-azobisisobutyronitrile herein sometimes referred to as AIBN. The tube was cooled in a Dry Ice-heptane bath to minus 65–75° C. and 0.5 ml. of the diisobutyl aluminum hydride-butyl acrylate complex, i.e., catalyst complex A from Example 1 was added thereto under nitrogen. The tube was removed from the bath, allowed to warm to room temperature (25° C.) and 1 ml. of the monomer-AIBN-complex solution (density 0.9 g./cc.) was withdrawn therefrom with a 1 ml. syringe and charged through a serum stopper into a preweighed dish contained in a sealed transparent box. The monomer solution forms a thin film on the bottom of the dish. Throughout this invention it is not necessary that the first stage polymerization be performed in an air containing sealed box. The reason this procedure was used was to facilitate the shift to the second stage polymerization which is preferably but not necessarily carried out in a deoxygenated atmosphere.

The first stage oxygen-sensitized polymerization in air was allowed to proceed in the box for 30 minutes. The box was then deoxygenated by flushing with nitrogen and placed directly over the bulb of a Model SL 3660 UV "Mineral Light." The partially polymerized film was then exposed to UV light (3660 angstroms) for 30 minutes to initiate the decomposition of azobisisobutyronitrile and thus perform the second stage of polymerization. The polymer-containing dish was then removed from the box and dried in a vacuum oven for 24–48 hours at 25° C. The dried hard polybutyl acrylate film weighed 0.6435 g. equal to a 71.5% yield based on the weight of 1.0 ml. of the monomer-AIBN-catalyst complex solution.

To point up the improvement in yield obtained by the two stage polymerization of the instant invention over that obtained by a single stage oxygen-sensitized polymerization per se the following example was performed.

*Example 4*

5 ml. of monomer solution B from Example 2 were charged under nitrogen to a deoxygenated serum-stoppered test tube. The tube was cooled in a bath to minus 65–75° C. and 0.5 ml. of catalyst complex A was added to the tube under nitrogen. The tube was removed from the bath and allowed to warm to room temperature (25° C.). 1.0 ml. of the monomer-complex solution was withdrawn from the tube with a 1.0 ml. syringe and charged through a serum-stopper into a preweighed dish contained in a sealed transparent box. The solution formed a thin film on the bottom of the dish. The oxygen sensitized polymerization was continued in air in the box for 30 minutes. The polymer containing dish was then removed from the box and dried in a vacuum oven for 24–48 hours at 25° C. The dried hard polybutyl acrylate weighed 0.4133 g. equal to a 46% conversion of monomer, based on the weight of 1.0 ml. of the mixed monomer-complex solution. A comparison of Examples 3 and 4 show that an increase in yield of over 50% is attained when the two stage polymerization of the instant invention is employed.

When Example 3 was repeated omitting the first stage polymerization and performing solely the second stage polymerization as taught therein, a soft tacky polybutylacrylate in an amount equal to a 67% conversion of the monomer based on the weight of 1.0 ml. of the mixed monomer-AIBN-complex solution was obtained.

*Example 5*

Example 3 was repeated except that the sealed transparent box was not deoxygenated by passing nitrogen therethrough prior to initiating the second stage polymerization with UV light. The yield of dried polybutyl acrylate was 49% based on the weight of 1.0 ml. of the mixed monomer-AIBN-complex solution. This example shows, in a comparison with Examples 3 and 4, that although second stage polymerization occurs in the presence of oxygen, compare Examples 4 and 5, the polymer yield is far below that obtained when the second stage polymerization with UV light is performed in a deoxygenated atmosphere as in Example 3.

*Example 6*

5 ml. of monomer solution B from Example 2 were charged under nitrogen to a deoxygenated serum-stoppered test tube containing 0.0144 g. of $\alpha,\alpha'$-azobisisobutyronitrile (AIBN). The tube was cooled to minus 65–75° C. and 0.5 ml. of catalyst complex A was added thereto under nitrogen. The tube was allowed to warm to room temperature (25° C.) and 1.0 ml. of the mixed monomer-AIBN-complex A solution was withdrawn therefrom and charged as a film to a preweighed dish contained in a sealed transparent box. The first stage polymerization was continued in a box containing air for 30 minutes. The dish containing the polymer film was removed from the box and placed in a circulating air oven maintained at a temperature of 85° C. The dish containing the polymer film was removed from the oven after a 45 minute second stage polymerization and dried in a vacuum oven for 24–28 hours at 25° C. The yield of dried polybutyl acrylate was 53.5% based on the weight of 1.0 ml. of the mixed monomer-AIBN-complex solution.

*Example 7*

Example 6 was repeated except that in the second stage polymerization the reaction in the oven was performed in a circulating nitrogen atmosphere instead of air. The yield of dried polybutyl acrylate film was 64.3% based on the weight of 1.0 ml. of the mixed monomer-AIBN-complex solution.

*Example 8*

A monomer solution was made up as in Example 2 except that 50 ml. of deoxygenated t-butyl acrylate was substituted for the 50 ml. of n-butyl acrylate. This monomer solution will be referred to herein as monomer solution C.

*Example 9*

Example 3 was repeated except that 5 ml. of monomer solution C was substituted for the 5 ml. of monomer solution B. After the two stage polymerization as in Example 3, the dried polybutyl acrylate film weighed 0.8374 g. equal to a 98% yield based on the weight of 1.0 ml. of the monomer-AIBN-complex solution.

The following examples in Table I show the percent conversion obtained in a two stage polymerization of various butyl acrylate compositions. The polymerization procedure followed was that set out in Example 3 using catalyst complex A and 0.0144 g. of $\alpha,\alpha'$-azobisisobutyronitrile activated by UV light (3660 A) in nitrogen. The composition of the monomer solution was varied as shown in Table I.

TABLE I

| Example No. | Composition | Percent Conversion |
| --- | --- | --- |
| 9 | t-Butyl acrylate | 74 |
| 10 | t-Butyl acrylate, 1.5% acrylic acid, 2.0% maleic anhydride | 99.5 |
| 11 | t-Butyl acrylate, 2.0% maleic anhydride | 92.5 |
| 12 | n-Butyl acrylate | 51.5 |

*Example 13*

5 ml. of deoxygenated methyl methacrylate were charged under nitrogen to a deoxygenated serum-stoppered test tube containing 0.0144 g. of $\alpha,\alpha'$-azobisisobutyronitrile (AIBN). The tube was cooled to minus 65–75° C. and 0.5 ml. of catalyst complex A from Example 1 was added to the tube under nitrogen. The tube was allowed to warm to 25° C. and 1 ml. of the mixed monomer-AIBN-complex solution was withdrawn therefrom with a 1 ml. syringe and sprayed as a film into a preweighed dish contained in a sealed transparent box. The first stage polymerization in air is continued in the box for 30 minutes. The box was then deoxygenated by flushing with nitrogen and placed directly over the bulb of a Model SL 3660 UV "Mineral Light." The partially polymerized film was then exposed to UV light of 3660 A. wave length for 30 minutes under nitrogen to carry out the second stage polymerization. The preweighed dish containing the polymer film was dried polymethyl methacrylate weighed 0.337 g. equal to a 35.8% conversion of the monomer based on the weight of 1.0 ml. of the monomer-AIBN-catalyst complex solution. This example was repeated by performing only the first stage polymerization and resulted in a 10.2% conversion of the monomer to polymethyl methacrylate based on the weight of 1.0 ml. of the monomer-catalyst complex solution.

*Example 14*

Example 13 was repeated except that 5 ml. of deoxygenated vinyl acetate was substituted for the 5 ml. of methyl methacrylate. The percent conversion of monomer to polyvinyl acetate after the two stage polymerization was 40.7% based on the weight of 1.0 ml. of the monomer-AIBN-complex solution.

*Example 15*

Example 13 was repeated except that 5 ml. of deoxygenated ethyl acrylate was substituted for the 5 ml. of methyl methacrylate. A 68.3% conversion of monomer to polyethyl acrylate resulted after the two stage polymerization.

*Example 16*

Example 13 was repeated except that 5 ml. of deoxygenated vinyl propionate was substituted for the 5 ml. of methyl methacrylate. The percent conversion of monomer to poly vinyl propionate after the two stage polymerization was 62.3%, based on the weight of 1.0 ml. of the monomer-AIBN-complex solution. This example was repeated using 2 ethyl hexyl acrylate as the monomer to be polymerized. The percent conversion was 76.4% by weight of 1.0 ml. of the monomer-AIBN-complex solution.

*Example 17*

Example 13 was repeated except that 5 ml. of decyl methacrylate was substituted for the 5 ml. of methyl methacrylate. A 43.2% conversion of monomer to polydecyl methacrylate, based on the weight of 1.0 ml. of the mixed monomer-AIBN-complex solution, was obtained.

*Example 18*

Example 13 was repeated except that 5 ml. of acrylonitrile was substituted for the 5 ml. of methyl methacrylate. The percent conversion of monomer to polyacrylonitrile was 23.4% based on the weight of 1.0 ml. of the mixed monomer-AIBN-complex solution.

*Example 19*

Example 13 was repeated except that 5 ml. of styrene was substituted for the 5 ml. of methyl methacrylate. A 27.8% conversion of monomer to polystyrene, based on the wight of 1.0 ml. of the mixed monomer-AIBN-complex solution resulted.

*Example 20*

Example 3 was repeated except that 0.28 ml. of pure diisobutyl aluminum hydride was added per se and not as a complex. The percent conversion of monomer to hard polybutyl acrylate was 68.4% based on the weight of 1.0 ml. of the mixed monomer-AIBN-diisobutyl aluminum hydride solution.

*Example 21*

Example 3 was repeated except that 0.5 ml. of a catalyst complex consisting of triisobutyl aluminum and n-butyl acrylate in a 1:1 mole ratio was substituted for the 0.5 ml. of catalyst complex A. 62.3% of the n-butyl acrylate, based on the weight of 1.0 ml. of the mixed monomer-AIBN-complex solution was converted to polymer.

*Example 22*

Example 3 was repeated except that 0.5 ml. of a catalyst complex consisting of diethyl aluminum chloride and ethyl acrylate in a 1:1 mole ratio was substituted for the 0.5 ml. of catalyst complex A. The yield of dried polybutyl acrylate was 74.5% based on the weight of 1.0 ml. of the mixed monomer-AIBN-complex solution.

*Example 23*

Example 3 was repeated except that the second stage polymerization was initiated by exposing the partially polymerized film to ultraviolet having a wave length of 2537 angstroms. The yield of dried hard polybutyl acrylate was 61.5% based on the weight of 1.0 ml. of the mixed monomer-AIBN-catalyst complex solution.

The examples in Table II following show the hardness obtained by various esters of acrylic acid compositions. The two stage polymerization procedure was the same as that in Example 3. All percentages of the additives are by weight of the monomer being polymerized. The cure period is the time the polymerized film is dried in a vacuum oven before testing for hardness unless otherwise noted. The hardness is determined by the test referred to supra.

TABLE II.—PENCIL HARDNESS OF VARIOUS POLYACRYLATE FILMS

| Monomer | Additives | Cure Period and Temperature | Hardness First Mar |
| --- | --- | --- | --- |
| Butyl acrylate | | 24 hrs. at 25° C. | 6 B |
| Do | 1.5% acrylic acid, 2.0% maleic anhydride. | 24 hrs. at 60° C. | 4 B |
| Ethyl acrylate | 1.15% acrylic acid, 4.5% maleic anhydride. | 2 months at 25° C. | 5 B |
| Do | 1.15% acrylic acid, 12.1% maleic anhydride. | do | F |
| Methyl acrylate | 1.1% acrylic acid, 2.2% maleic anhydride. | do | F |
| t-Butyl acrylate | | 24 hrs. at 25° C. | 6 B |
| Do | | 24 hrs. at 60° C. | B |
| Do | 1.2% acrylic acid | 24 hrs. at 25° C. | 6 B |
| Do | do | 24 hrs. at 60° C. | F |

The vinyl polymers obtained by the practice of the instant invention have uses analogous to vinyl polymers prepared by other prior art processes such as impregnations of porous materials such as paper. In addition the acrylate polymers, because of their improved hardness, as prepared by this process, can be used as coatings.

We claim:

1. A composition comprising (A) a vinyl monomer of the formula

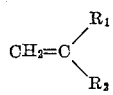

wherein $R_1$ is a member of the group consisting of hydrogen and an organic radical and $R_2$ is an organic radical, (B) 0.01–25% by weight of said vinyl monomer of an aluminum alkyl compound and (C) 0.05–10% by weight of said vinyl monomer of $\alpha,\alpha'$-azobisisobutyronitrile.

2. The composition according to claim 1 which also contains 0.5–5.0% acrylic acid by weight of the vinyl monomer.

3. The composition according to claim 1 which also contains 0.5–5.0% maleic anhydride by weight of the vinyl monomer.

4. The composition of claim 1 wherein the vinyl monomer is an acrylic acid ester of the group consisting of n-butyl acrylate, t-butyl acrylate, ethyl acrylate, methyl acrylate, and 2-ethylhexyl acrylate.

5. The composition of claim 1 wherein the vinyl monomer is a vinyl alkanoate of the group consisting of vinyl acetate and vinyl propionate.

6. The composition of claim 1 wherein the vinyl monomer is a methacrylic acid ester of the group consisting of methyl methacrylate, ethyl methacrylate and n-hexyl methacrylate.

7. The composition of claim 1 wherein the vinyl monomer is a member of the group consisting of styrene and acrylonitrile.

8. A two stage polymerization process which comprises (1) initiating the first stage polymerization by exposing the composition of claim 1 to an oxygen-containing atmosphere and after 1 to 60 minutes initiating the second stage polymerization by, preferably in an oxygen-free atmosphere, decomposing the $\alpha,\alpha'$-azobisisobutyronitrile into free radicals.

9. The process according to claim 8 wherein the $\alpha,\alpha'$-azobisisobutyronitrile is decomposed by means of ultraviolet light having a wave length in the range 2000 to 4000 angstroms.

10. The process according to claim 8 wherein the $\alpha,\alpha'$-azobisisobutyronitrile is decomposed by heating the composition to a temperature ranging from 70° C. to the boiling point of the vinyl monomer.

11. The process according to claim 8 wherein the composition also contains 0.5–5.0% acrylic acid based on the weight of the vinyl monomer.

12. The process according to claim 8 wherein the composition also contains 0.5–5.0% maleic anhydride based on the weight of the vinyl monomer.

13. A two stage polymerization process which comprises applying the composition of claim 1 to a surface and initiating the first stage polymerization by exposing the coated surface to an oxygen containing atmosphere and after 1 to 60 minutes, preferably in an oxygen-free atmosphere, initiating the second stage polymerization by decomposing the $\alpha,\alpha'$-azobisisobutyronitrile into free radicals.

14. The process according to claim 13 wherein the $\alpha,\alpha'$-azobisisobuytronitrile is decomposed by ultraviolet light having a wave length in the range 2000 to 4000 angstroms.

15. The process according to claim 13 wherein the $\alpha,\alpha'$-azobisisobutyronitrile is decomposed by heating the composition to a temperature ranging from 70° C. to the boiling point of the vinyl monomer.

16. The process according to claim 13 wherein the composition also contains 0.5–5.0% acrylic acid based on the weight of the vinyl monomer.

17. The process according to claim 13 wherein the composition also contains 0.5–5.0% maleic anhydride based on the weight of the vinyl monomer.

18. The product resulting from the process of claim 8.

19. The product resulting from the process of claim 13.

20. The process according to claim 8 wherein the vinyl monomer is an acrylic acid ester of the group consisting of n-butyl acrylate, t-butyl acrylate, ethyl acrylate, methyl acrylate, tridecyl acrylate and 2-ethylhexyl acrylate.

21. The composition of claim 8 wherein the vinyl monomer is a vinyl alkanoate of the group consisting of vinyl acetate and vinyl propionate.

22. The composition of claim 8 wherein the vinyl monomer is a methacrylic ester of the group consisting of methyl methacrylate, ethyl methacrylate and n-hexyl methacrylate.

23. The composition of claim 8 wherein the vinyl monomer is a member of the group consisting of styrene and acrylonitrile.

24. The composition of claim 13 wherein the vinyl monomer is an acrylic acid ester of the group consisting of n-butyl acrylate, t-butyl acrylate, ethyl acrylate, methyl acrylate, and 2-ethylhexyl acrylate.

25. The composition of claim 13 wherein the vinyl monomer is a vinyl alkanoate of the group consisting of vinyl acetate and vinyl propionate.

26. The composition of claim 13 wherein the vinyl monomer is a methacrylic acid ester of the group consisting of methyl methacrylate, ethyl methacrylate and decyl methacrylate.

27. The composition of claim 13 wherein the vinyl monomer is a member of the group consisting of styrene and acrylonitrile.

28. The composition according to claim 1 wherein the aluminum alkyl compound is complexed in a 1:1 mole ratio with an ester of monocarboxylic acid, said acid containing 1–20 carbon atoms.

29. The composition according to claim 8 wherein the aluminum alkyl compound is complexed in a 1:1 mole ratio with an ester of monocarboxylic acid, said acid containing 1–20 carbon atoms.

30. The composition according to claim 13 wherein the aluminum alkyl compound is complexed in a 1:1 mole ratio with an ester of monocarboxylic acid, said acid containing 1–20 carbon atoms.

References Cited by the Examiner

UNITED STATES PATENTS

| | | | |
|---|---|---|---|
| 2,471,959 | 5/1949 | Hunt | 260—80 |
| 3,198,772 | 8/1965 | Chadha | 260—80.5 |

JOSEPH L. SCHOFER, *Primary Examiner.*

L. G. CHILDERS, *Assistant Examiner.*